(12) United States Patent
Mattox (10) Patent No.: US 11,278,838 B2
(45) Date of Patent: Mar. 22, 2022

(54) GASKETS AND DIAPHRAGMS FOR FILTRATION SYSTEMS

(71) Applicant: Schenck Process LLC, Kansas City, MO (US)

(72) Inventor: Daniel Mattox, Kansas City, MO (US)

(73) Assignee: Schenck Process LLC, Kansas City, MO (US)

( * ) Notice: Subject to any disclaimer, the term of this patent is extended or adjusted under 35 U.S.C. 154(b) by 239 days.

(21) Appl. No.: 16/572,993

(22) Filed: Sep. 17, 2019

(65) Prior Publication Data

US 2020/0086259 A1 Mar. 19, 2020

Related U.S. Application Data

(60) Provisional application No. 62/732,773, filed on Sep. 18, 2018.

(51) Int. Cl.
| | |
|---|---|
| *B01D 46/00* | (2006.01) |
| *B01D 46/10* | (2006.01) |
| *B01D 46/42* | (2006.01) |
| *F16K 7/12* | (2006.01) |

(52) U.S. Cl.
CPC ..... *B01D 46/4272* (2013.01); *B01D 46/0002* (2013.01); *B01D 46/0068* (2013.01); *B01D 46/10* (2013.01); *B01D 2201/34* (2013.01); *B01D 2201/345* (2013.01); *B01D 2271/02* (2013.01); *F16K 7/12* (2013.01)

(58) Field of Classification Search
CPC ....... B01D 46/0002; B01D 46/0068; B01D 46/10; B01D 46/4272; B01D 2201/34; B01D 2201/345; B01D 2271/02; F16K 7/12; F16K 7/17
USPC .............................. 55/498, 502, 302; 95/280
See application file for complete search history.

(56) References Cited

U.S. PATENT DOCUMENTS

| | | | | |
|---|---|---|---|---|
| 3,834,134 | A * | 9/1974 | McAllister | B01D 46/02 55/378 |
| 5,720,790 | A * | 2/1998 | Kometani | B01D 39/163 55/497 |
| 7,186,284 | B2 * | 3/2007 | Clements | B01D 46/0005 55/341.1 |
| 8,061,530 | B2 * | 11/2011 | Kindkeppel | B01D 46/009 210/450 |
| 8,409,312 | B2 * | 4/2013 | Gorg | B01D 46/521 55/385.3 |
| 8,685,130 | B2 * | 4/2014 | Nelson | B01D 46/0005 55/521 |
| 2002/0152731 | A1 * | 10/2002 | Reich | B23Q 11/0046 55/385.1 |
| 2010/0123312 | A1 * | 5/2010 | Scott | F16L 19/07 285/386 |

(Continued)

*Primary Examiner* — Minh Chau T Pham
(74) *Attorney, Agent, or Firm* — Hovey Williams LLP (57) ABSTRACT

Specialized arch gaskets for dust collection systems are provided that reinforce certain connections points within the system. More particularly, the arch gaskets may better reinforce the pressure conditions of the dust collection system and enhance the sanitary conditions within the system. The large side engagement formed by the legs of the arch gasket is able to provide a desirable amount of adhesive surface to connect to the desired component in the system (e.g., a door), which may allow a user to more easily install the arch gasket into the system at its intended location.

18 Claims, 12 Drawing Sheets

(56) References Cited

U.S. PATENT DOCUMENTS

| | | | |
|---|---|---|---|
| 2011/0083408 A1* | 4/2011 | Raether | B01D 46/42 55/303 |
| 2011/0308214 A1* | 12/2011 | Jessberger | F02M 35/0203 55/502 |
| 2012/0073434 A1* | 3/2012 | Doehla | B01D 46/02 95/19 |
| 2013/0219842 A1* | 8/2013 | Strugalski | B01D 46/02 55/379 |
| 2014/0260143 A1* | 9/2014 | Kaiser | B01D 46/10 55/501 |
| 2014/0318091 A1* | 10/2014 | Rieger | F02M 35/02416 55/502 |
| 2015/0020489 A1* | 1/2015 | Sudermann | B01D 46/0001 55/502 |
| 2016/0040633 A1* | 2/2016 | Schmid | B29C 44/1271 55/502 |
| 2016/0059172 A1* | 3/2016 | Allott | B01D 46/0005 55/502 |

\* cited by examiner

GASKETS AND DIAPHRAGMS FOR FILTRATION SYSTEMS

RELATED APPLICATIONS

This application claims the priority benefit under 35 U.S.C. § 119(e) of U.S. Provisional Patent Application Ser. No. 62/732,773 entitled "GASKETS AND DIAPHRAGMS FOR FILTRATION SYSTEMS," filed Sep. 18, 2018, the entire disclosure of which is incorporated herein by reference.

BACKGROUND

1. Field of the Invention

The present invention generally relates to filtration systems. More particularly, the present invention generally relates to dust collection systems comprising specific gaskets and/or diaphragm valves.

2. Description of the Related Art

Dust collection systems for filtering and collecting dust, dirt, and other fine particulate from a particulate-laden air stream commonly include air filters, such as air filter cartridges, for filtering the dust from the clean air. Typically, the cartridges are mounted in a plate, commonly referred to as a tube sheet or a cell plate, that separates the dust collection into a lower, dirty air chamber and an upper, clean air chamber. The air filter cartridges may include filter media that tend to accumulate at least a portion of the separated dust. To maintain an efficient filtering system, the dust accumulated on the filter media must be at least partially removed, especially if the dust collects in a relatively thick layer.

To dislodge the collected dust from the filter media and otherwise refresh the media, dust collection systems commonly direct pressurized air against and through the air filter cartridges in pulses, i.e., intermittently. To direct the pressurized air against and through the filter cartridges, a pipe, commonly referred to as a purge pipe, is positioned above the air filter cartridge. The pipe includes small openings through a bottom of the pipe facing the air filter cartridge and is fluidly connected to a pulse valve that controls pressurized air passing through the pipe, the openings in the pipe, and the air filter cartridge. The pressurized air assists in dislodging collected dust from the filter media.

Each purge pipe is also typically connected to the pulse valve in an airtight connection with either a compression coupling, a threaded union, a flexible hose and clamps, or other securement mechanism. Additionally, not only must the purge pipe be connected to the pulse valve in an airtight communication, it should be securely positioned within the system and not susceptible to any movement during operation. Otherwise, there may be a misalignment of the holes in the purge pipe and over the air filter cartridges, which results in less than optimal cleaning of the filter media.

Some dust collection systems may utilize diaphragm valves as the pulse valves to better control the release of air pulses during the cleaning cycle. Generally, the diaphragm valves comprise a rubber diaphragm that opens and closes to release the compressed air stored in the air header tank. The air then passes through the valve into the pulse pipes above the filters.

Additionally, such dust collection systems may operate at higher pressures and, therefore, care must be taken to ensure that efficient operating pressures are maintained within the systems. Thus, gaskets may be used throughout the system to better maintain pressure conditions. However, new and more efficient gasket designs are still being developed in order to enhance pressure maintenance within these systems.

Accordingly, further research is still being conducted on superior diaphragm valves for pulsed air systems in dust collection systems and for more efficient gaskets that may help to better maintain pressure conditions within the dust collection system.

SUMMARY

One or more embodiments of the present invention generally concern an arch gasket for a dust collection system. Generally, the arch gasket comprises: (a) a main body; (b) a first node and a second node extending from the main body thereby forming a concave arch; and (c) a first leg extension and a second leg extension extending from the main body thereby forming a cavity.

One or more embodiments of the present invention generally concern a dust collection system. Generally, the dust collection system comprises: (a) a tube sheet door; (b) a plenum; and (c) an arch gasket at least partially disposed between the tube sheet door and the plenum. Furthermore, the arch gasket comprises: (i) a main body; (ii) a first node and a second node extending from the main body thereby forming a concave arch; and (iii) a first leg extension and a second leg extension extending from the main body thereby forming a cavity.

BRIEF DESCRIPTION OF THE FIGURES

Embodiments of the present invention are described herein with reference to the following drawing figures, wherein.

DETAILED DESCRIPTION

Embodiments of the present invention solve the above-described problems and provide a distinct advance in the art of air distribution arrangements for dust collection systems. In particular, embodiments of the present invention provide a dust collection system broadly comprising a housing; a hopper extending from the housing to collect dust; a tube sheet mounted within the housing and generally dividing the housing into a lower, dirty air chamber and an upper, clean air chamber; at least one filter cartridge configured to be removably mounted in the tube sheet; and a pulsed air system for at least partially cleaning the at least one filter cartridge. An exemplary dust collection system is depicted in U.S. Pat. No. 8,157,878, which is incorporated herein by reference in its entirety.

In various embodiments, the dust collection systems of the present invention may utilize specialized arch gaskets and/or corner gaskets to reinforce certain connections points within the system. As discussed in greater detail below, the arch gaskets and the corner gaskets of the present invention may better reinforce the pressure conditions of the system and/or enhance the sanitary conditions within the system.

In various embodiments, the pulsed air system of the present invention broadly comprises a pressurized air source; at least one pulsed air valve; a controller for controlling the pulsed air valve and pulsed distribution of the pressurized air; an air distribution assembly including a plurality of purge pipes; and tubing for delivering the pressurized air from the pressurized air source and to the air distribution assembly. As discussed below, these pulsed air valves can comprise the diaphragm valves of the present invention, which are discussed in further detail below.

Figure 1:
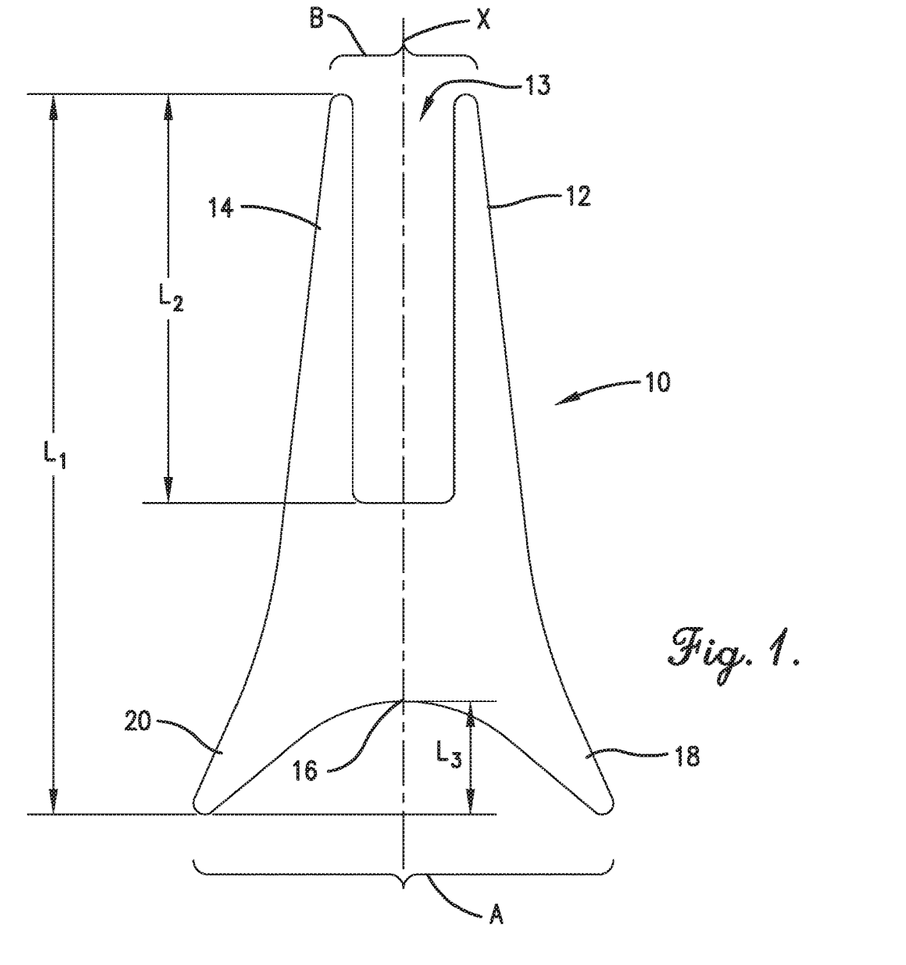
FIG. 1 depicts a side view of an arch gasket according to an embodiment of the present invention.

Turning now to FIG. 1, a cross-sectional side view of the arch gasket 10 of the present invention is depicted. As shown in FIG. 1, the arch gasket 10 can comprise two main leg extensions 12, 14 and an arch 16 formed by two lobes 18, 20 extending from the main body of the arch gasket 10. The legs 12, 14 of the arch gasket 10 are designed to be able to bend around radius corners, such as those of the doors in the dust collection system, and are able to also enhance the sealing capability to the pressure or vacuum encountered where the gasket is placed. The legs 12, 14 and arch 16 allow for the production of a gasket with a much higher stiffness and a longer sealing tolerance distance. For example, the arch gasket 10 design in FIG. 1 allows the door and other system components in contact with the gasket 10 to be made with simple sheet metal and welding without the need for a secondary machining step to get tolerances into a reasonable value for other sealing methods. FIG. 1 also depicts the cavity 13 formed by the legs 12, 14. This cavity 13 can be adapted to better grip certain components in the dust collection system, such as tube sheets doors or plenums.

Furthermore, FIG. 1 also depicts the vertical axis X of the gasket 10, which divides the gasket into two symmetrical pieces, along with the maximum width A of the gasket 10, the minimum width B of the gasket 10, the maximum length $L_1$ of the gasket 10, the length $L_2$ of the legs 12, 14, and the maximum depth $L_3$ of the arch 16. In various embodiments, the maximum width A of the gasket 10 is at least 1.1, 1.2, 1.3, 1.4, or 1.5 times greater than the minimum width B of the gasket 10. Additionally or alternatively, in various embodiments, the maximum length $L_1$ of the gasket 10 is at least 1.1, 1.2, 1.3, 1.4, or 1.5 and/or less than 4, 3.5, 3, 2.5, 2, 1.9, or 1.8 times greater than the length $L_2$ of the legs 12, 14. In other embodiments, the length $L_2$ of the legs 12, 14 is at least 1.5, 2, 2.5, 3, 3.5, 4, 4.5, or 5 times greater than the maximum depth $L_3$ of the arch 16.

Unlike prior art gaskets, which have removed inner-cores therefrom to allow for greater flexibility, the arch gasket 10 maintains this inner core in order to increase the reliability and durability of the gasket. More particularly, the gasket 10 configuration depicted in FIG. 1 helps prevent the gasket from splitting from too much force being imparted onto the gasket 10 because the gasket 10 is solid throughout. Moreover, the large side engagement formed by the legs 12, 14 is able to provide a desirable amount of adhesive surface to connect to the desired component in the system (e.g., a door), which may allow a user to more easily install the gasket 10 into the system at its intended location. Thus, the arch gasket 10 is designed to hold relatively high pressures or vacuums compared to the down force needed to be imparted on the gasket into the opposite sealing side.

In various embodiments, the arch gasket 10 can be produced from various types of elastomers. In certain embodiments, the arch gasket 10 can be produced from a silicone elastomer having a shore hardness of at least 30, 35, or 40 durometers.

Figure 2:
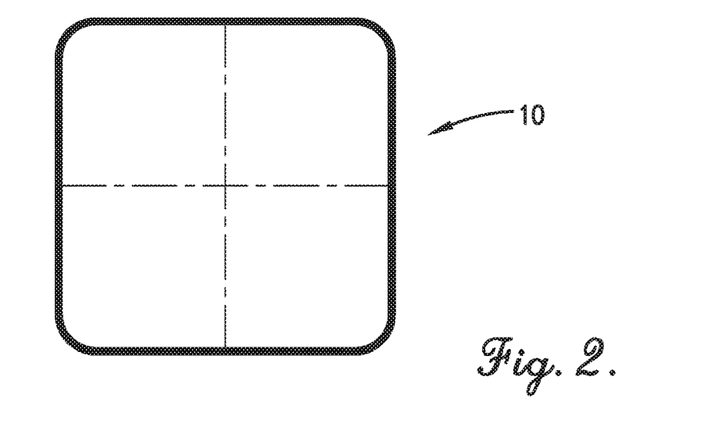
FIG. 2 depicts an alternative view of the arch gasket according to an embodiment of the present invention.
Figure 3:
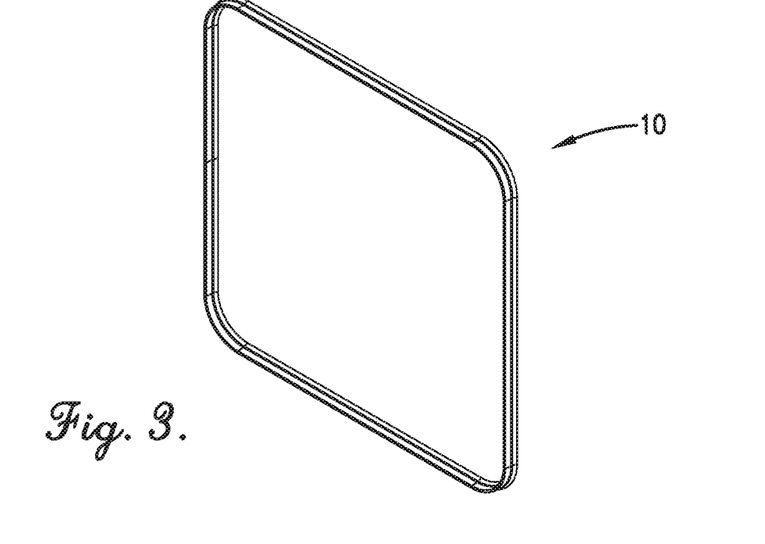
FIG. 3 depicts an alternative view of the arch gasket according to an embodiment of the present invention.

FIGS. 2 and 3 depict elongated forms of the arch gaskets 10 that are designed to fit between the door and plenum in the dust collection system according to one embodiment of the present invention. Although the arch gasket 10 is depicted as having a square shape, it is readily appreciated that the gasket 10 may comprise different shapes depending on the intended location and placement of the gasket 10.

Figure 4:
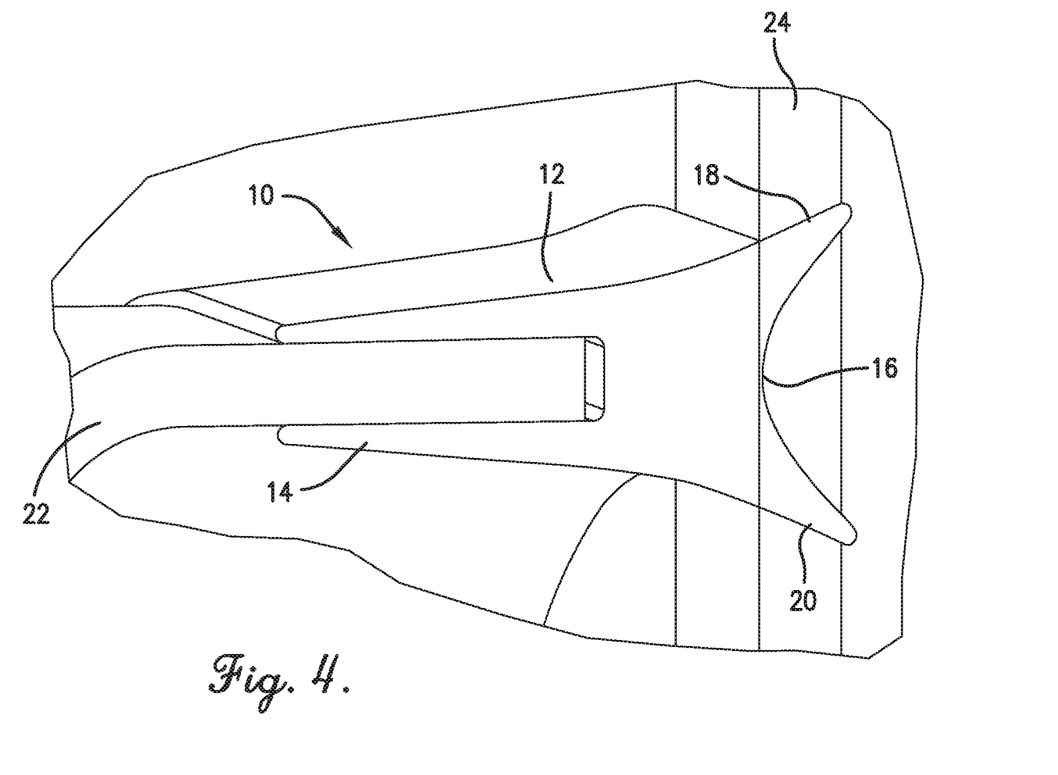
FIG. 4 depicts an embodiment of the arch gasket used between the tube sheet access door and plenum in the dust collection system.
Figure 5:
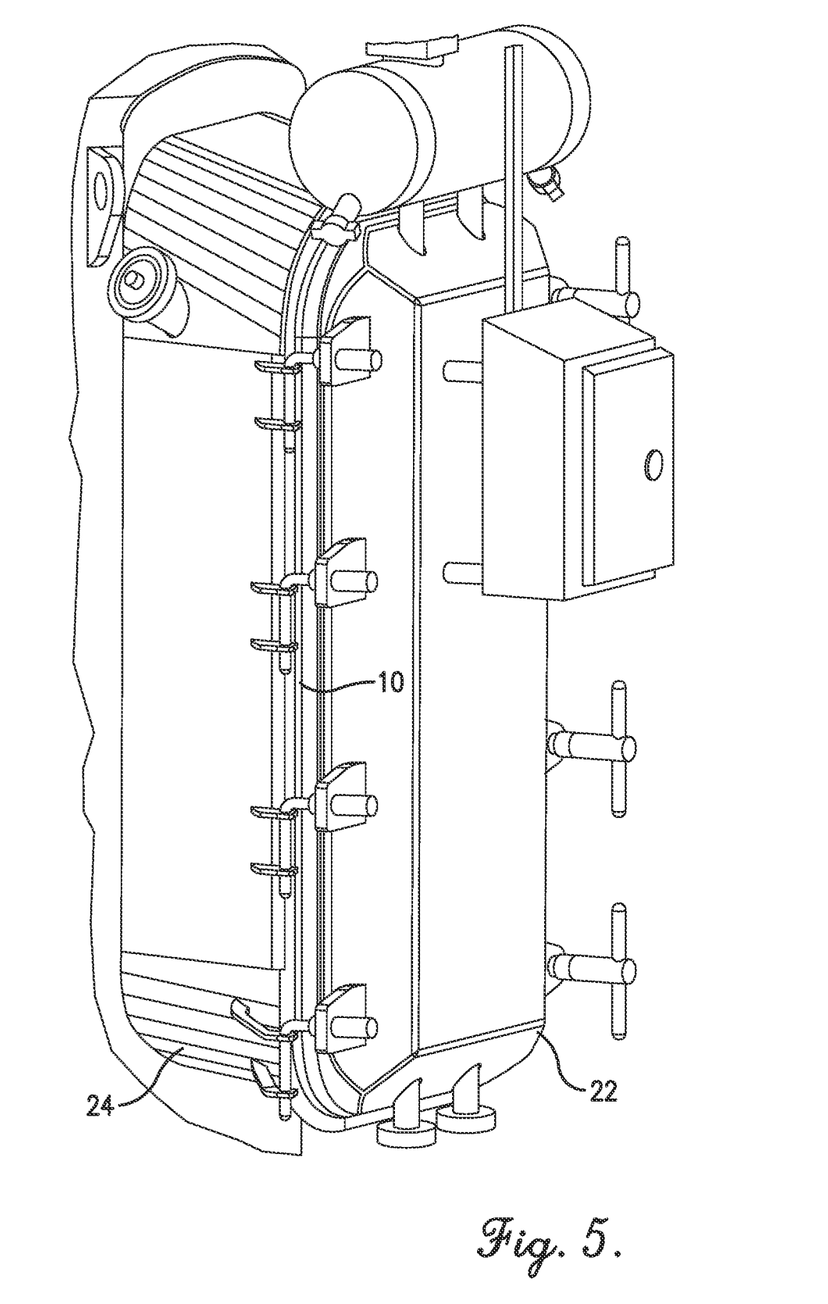
FIG. 5 depicts an embodiment of the arch gasket used between the tube sheet access door and plenum in the dust collection system.

FIGS. 4 and 5 depict an installed state of the arch gasket 10. More particularly, FIG. 4 depicts the arch gasket 10 positioned between the tube sheet door 22 and plenum 24 of the dust collection system. The arch gasket 10 may be disposed between the door 22 and plenum 24 to assist in creating the air-tight connection between these components during operation of the dust collection system. As depicted in FIG. 4, the door can be placed within the cavity formed by the two legs 12, 14 of the arch gasket 10, while the arch 16 of the gaskets is positioned proximate to the plenum 24. As shown in FIG. 4, the legs 12, 14 are able to bend around radius corners of the door 22 and, consequently, may maximize the sealing capability of the door 22.

FIG. 5 provides a broader view of the arch gasket 10 placed between the door 22 and plenum 24.

Figure 6:
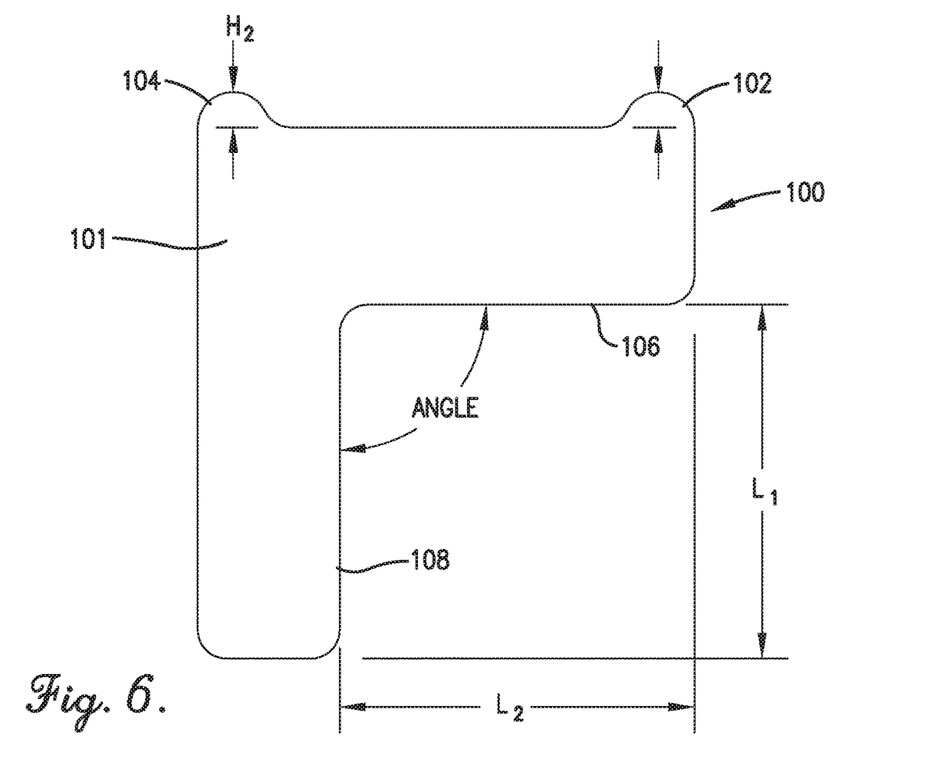
FIG. 6 depicts a side view of a corner gasket according to an embodiment of the present invention.

Next, FIG. 6 depicts a cross-sectional side view of the corner gasket 100 of the present invention. As shown in FIG. 1, the corner gasket 100 comprises two nodes 102, 104 positioned on the plenum side of the gasket 100. Thus, nodes 102, 104 may be positioned on the same surface of the gasket 100. The main body 101 of the gasket 100 is formed by a first extension 106 and a second extension 108 extending from the main body 101.

FIG. 6 also depicts the length $L_1$ of the first extension 106, the length $L_2$ of the second extension 108, the maximum height $H_1$ of the first node 102, the maximum height $H_2$ of the second node 104, and the angle formed between the first extension 106 and the second extension 108. In various embodiments, the length $L_1$ of the first extension 106 and the length $L_2$ of the second extension 108 can be substantially the same. Alternatively, the length $L_1$ of the first extension 106 and the length $L_2$ of the second extension 108 can be different. For example, the length $L_1$ of the first extension 106 can be greater than or less than the length $L_2$ of the second extension 108.

In various embodiments, the maximum height $H_1$ of the first node 102 and the maximum height $H_2$ of the second node 104 can be substantially the same. Alternatively, the maximum height $H_1$ of the first node 102 can be greater than or less than the maximum height $H_2$ of the second node 104.

In various embodiments, the corner formed between the first extension 106 and the second extension 108 may have an angle of at least 25, 40, 50, 60, 70, or 80 degrees and/or less than 150, 140, 130, 120, 110, 100, or 95 degrees.

In various embodiments, the corner gasket 100 is designed to be used with filter cartridges and the tube sheet door hinge. A benefit of the corner gasket 100 is that it maintains a minimal profile, yet still provides superior sealing.

More particularly, the corner gasket 100 is designed to hold onto a slight edge. Generally, the corner gasket 100 may accomplish this superior grip by grabbing onto the surface perpendicular to gasket 100. The two small lobes 102, 104 on the inner and outer sealing surface of the gasket 100 help provide this superior grip. The inner lobes 102, 104 may be sized so that they may act like an O-ring when squeezed into the region. A secondary benefit of the lobes 102, 104 is that the excess material at these points allows the gasket 100 to actually seal better as the pressure increases. This may be desirable because the pressure in the system may greatly fluctuate every time a cleaning pulse of air is sprayed into the filters. Unlike prior art gaskets, the corner gaskets 100 are able to better handle these abrupt changes in pressure.

Although depicted as being used with the tube sheet door, the plenum back sheet, and the filter cartridges, the corner gaskets 100 may have other uses. For example, the corner gasket 100 may be useful wherever no-ledge interactions are present in the system.

In various embodiments, the corner gasket 100 can be produced from various types of elastomers. In certain embodiments, the corner gasket 100 can be produced from a silicone elastomer having a shore hardness of at least 30, 35, or 40 durometers.

Figure 7:
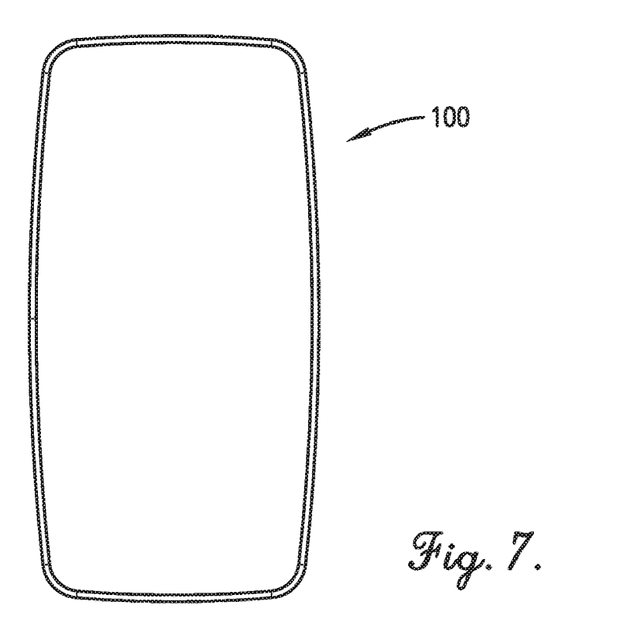
FIG. 7 depicts an alternative view of the corner gasket according to an embodiment of the present invention.
Figure 8:
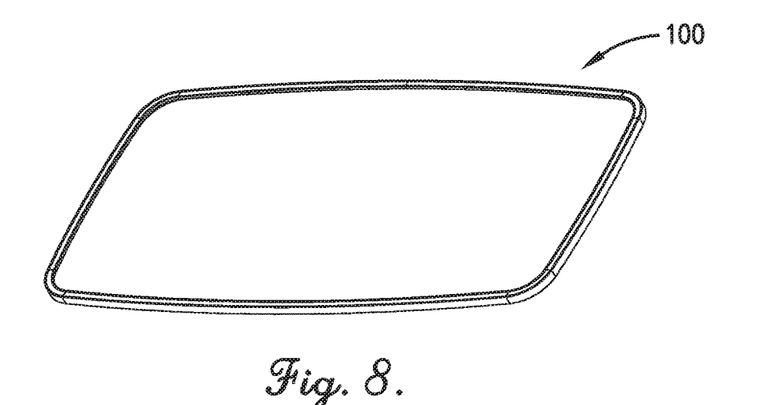
FIG. 8 depicts an alternative view of the corner gasket according to an embodiment of the present invention.

FIGS. 7 and 8 depict elongated forms of the corner gaskets 100 that are designed to fit between the door and plenum in the dust collection system according to one embodiment of the present invention. Although the corner gasket 100 is depicted as having a specific shape in FIGS. 7 and 8, it is readily appreciated that the gasket 100 may comprise different shapes depending on the intended location and placement of the gasket 100.

Figure 9:
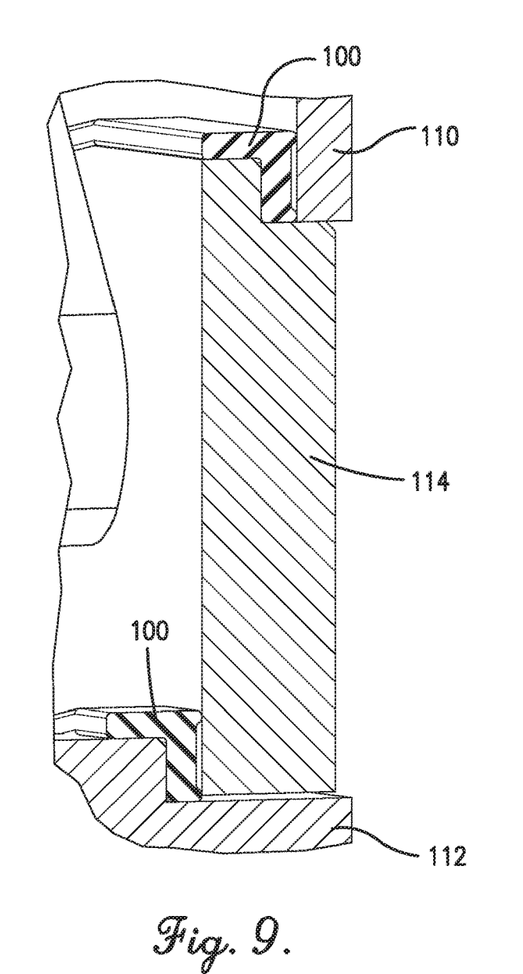
FIG. 9 depicts an embodiment of the corner gasket used between the filtration cartridge and the plenum back sheet and tube sheet access door in the dust collection system.

FIG. 9 depicts an installed state of the corner gaskets 100. More particularly, FIG. 9 depicts corner gaskets 100 positioned between the tube sheet access door 114 and the plenum back sheet (housing sidewall) 110 and the filter cartridge 112. As shown in FIG. 9, the corner gasket 100 may be disposed between these components to thereby create an air-tight connection between these components during operation of the dust collection system.

Although not depicted in the figures, the dust collection systems of the present invention may comprise a pulsed air system that broadly encompasses a pressurized (i.e., compressed) air source, at least one diaphragm valve assembly of the present invention, which functions as the pulsed air valve; a controller for controlling the diaphragm valve assembly and pulsed distribution of the pressurized air; an air distribution assembly including a plurality of purge pipes; and tubing for delivering the pressurized air from the pressurized air source and to the air distribution assembly. The diaphragm valve assembly is preferably controlled by the controller and is operable to selectively deliver pressurized air to the air distribution assembly in short pulses or bursts. More than one diaphragm valve assembly may be employed depending on the size of the air distribution assembly and the number of purge pipes.

Tubing may connect the air source to the diaphragm valve assembly, and the diaphragm valve assembly to the air distribution assembly. Therefore, each purge pipe of the air distribution assembly may be fluidly connected to a respective tube for receipt of pressurized air through the purge pipe. Purge pipes are generally elongated and are positioned above the air filter cartridges for directing pressurized air against and through the filter cartridges.

Turning now to the diaphragm valve assemblies of the present invention, various embodiments of these diaphragm valves are depicted in FIGS. 10-17.

Figure 10:
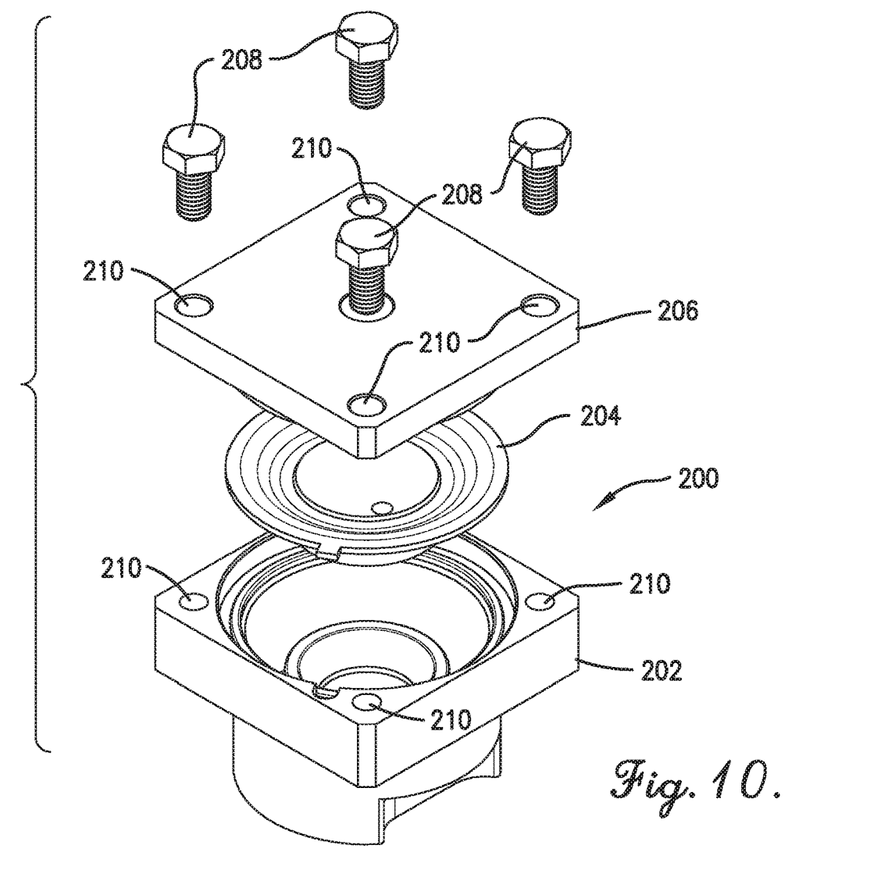
FIG. 10 depicts an embodiment of the diaphragm valve assembly according to the present invention.
Figure 11:
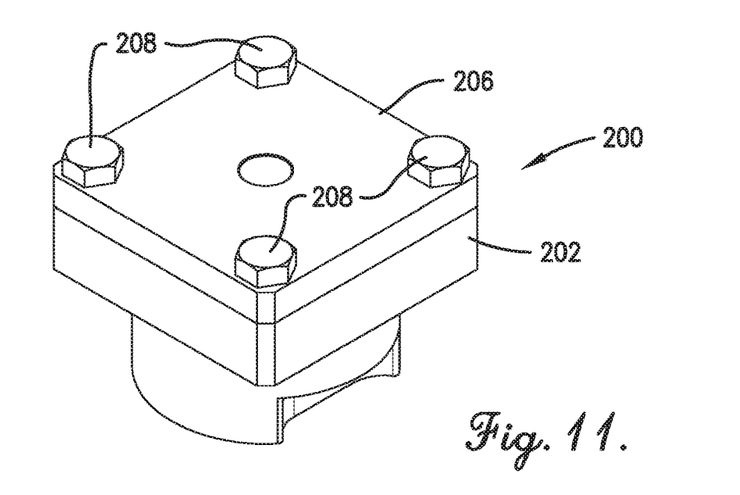
FIG. 11 depicts an embodiment of the diaphragm valve assembly according to the present invention.

The diaphragm valve assembly is depicted in FIG. 10. As shown in FIG. 10, the diaphragm valve assembly 200 comprises a diaphragm body 202, a diaphragm 204, a diaphragm cap 206, a plurality of bolts 208, and a plurality of openings 210. FIG. 11 provides another view of the diaphragm valve assembly 200 in assembled form.

Figure 12A:
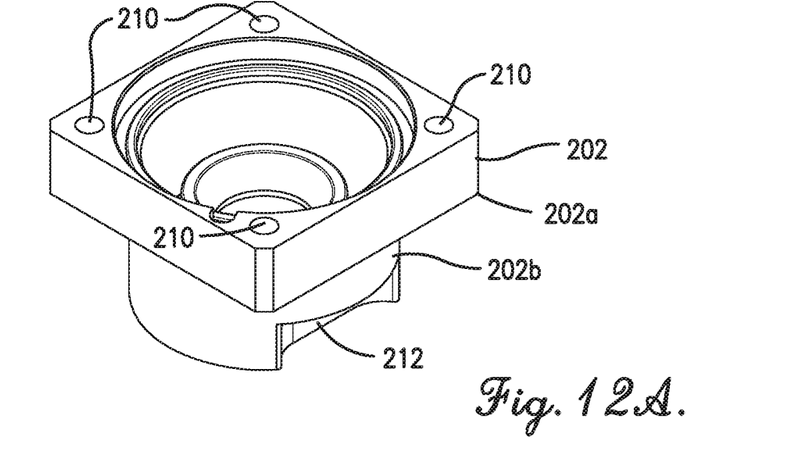
FIGS. 12A-12E depict various views of the diaphragm valve body.
Figure 12B:
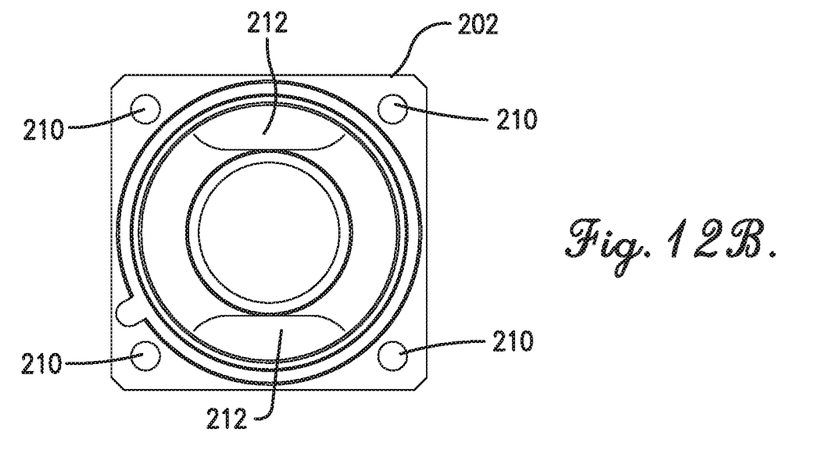
Figure 12C:
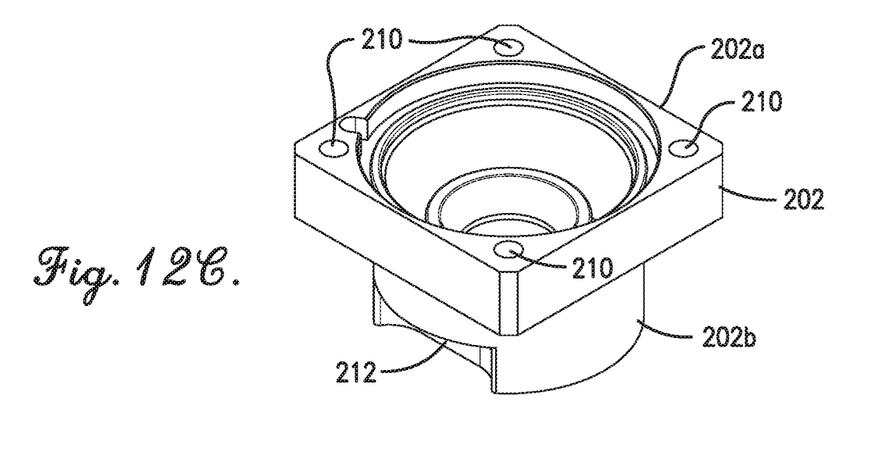
Figure 12D:
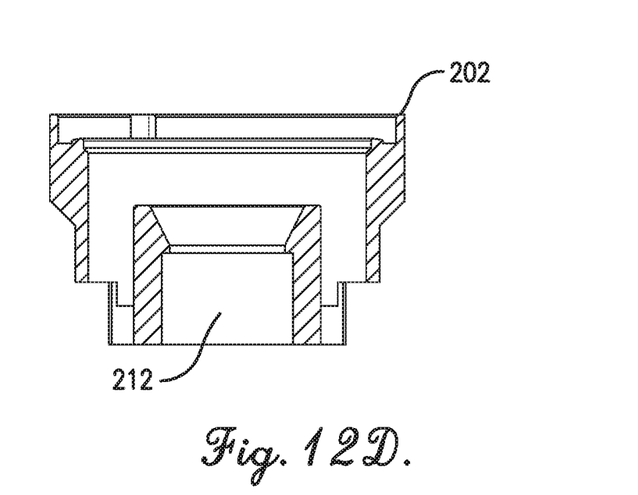

FIGS. 12A-12E provide various views of the diaphragm valve body 202, which may be divided into an upper body 202a and a lower body 202b. The upper body 202a comprises a shaped opening that is configured to facilitate the presence of the diaphragm 204. For example, the shaped opening of the upper body 202a may hold the diaphragm 204 and keep the diaphragm 204 separate from the lower body 202b. Generally, the diaphragm 204 may regulate the flow of air from the pressurized air source. The lower body 202b may also contain an opening to facilitate the passage of air pulses during the cleaning cycle to the purge pipes. As shown in FIGS. 12A, 12C, and 12D, the shaped opening of the upper body 202b may taper down into the opening within the lower body 202b.

As shown in FIGS. 12A-12E, the upper body 202a has a greater width relative to the lower body 202b. The difference between the upper body 202a and the lower body 202b is generally based on the presence of the diaphragm 204 in the upper body 202b. Moreover, the cross-sectional shapes of the upper body 202a and the lower body 202b can be the same or different, depending on the intended placement of the diaphragm valve assembly.

Furthermore, FIGS. 12A-12E depict how the diaphragm valve body 202 comprises a plurality of openings 210 and one or more indentations 212 machined into the lower body 202b. These openings 210 and indentations 212 are important because they allow the diaphragm valve assembly 200 to be installed into a pipe or tube or on a flat surface. For example, the indentations 212 may be configured to attach to specific surfaces, such as a pipe or tube. In addition, the indentations 212 may also facilitate improved airflow (cv and kv coefficients). Another possible benefit of the indentations 212 is that they may be arranged so as to mitigate moisture accumulation around the diaphragm valve assembly 200. Consequently, this can help enhance the sanitation conditions within the dust collection system as it mitigates undesirable water formation. Generally, in various embodiments, the diaphragm valve body 202 comprises only one indentation 212 or two indentations 212. In certain embodiments, the indentations 212 may open directly into the opening throughout the lower body 202b.

Figure 12E:
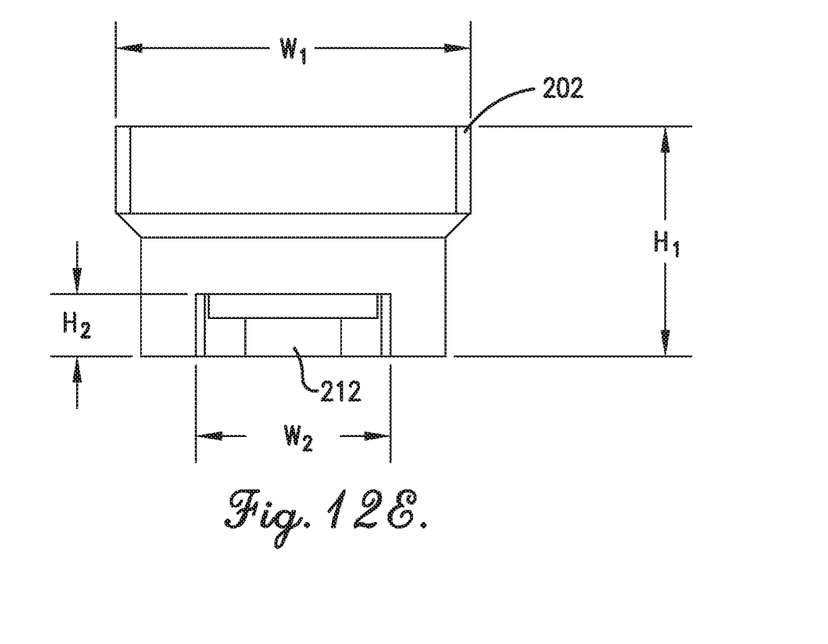

The size and shape of the indentations 212 can be important and affect their performance properties. The shape of the indentations 212 may be configured based on the intended use and placement of the diaphragm valve assembly. FIG. 12E depicts the maximum width $W_1$ of the diaphragm valve body 202, the maximum width $W_2$ of the indentation 212, the maximum height $H_1$ of the diaphragm valve body 202, and the maximum height $H_2$ of the indentation 212.

In various embodiments, the maximum width $W_1$ of the diaphragm valve body 202 is at least 1.1, 1.2, 1.3, 1.4, 1.5, 1.6, 1.7, 1.8, 1.9, or 2 and/or less than 10, 9, 8, 7, 6, 5, 4, 3, or 2 times greater than the maximum width $W_2$ of the indentation 212.

In various embodiments, the maximum height $H_1$ of the diaphragm valve body 202 is at least 1.1, 1.2, 1.3, 1.4, 1.5, 1.6, 1.7, 1.8, 1.9, or 2 and/or less than 10, 9, 8, 7, 6, 5, 4, 3, or 2 times greater than the maximum height $H_2$ of the indentation 212.

Figure 13:
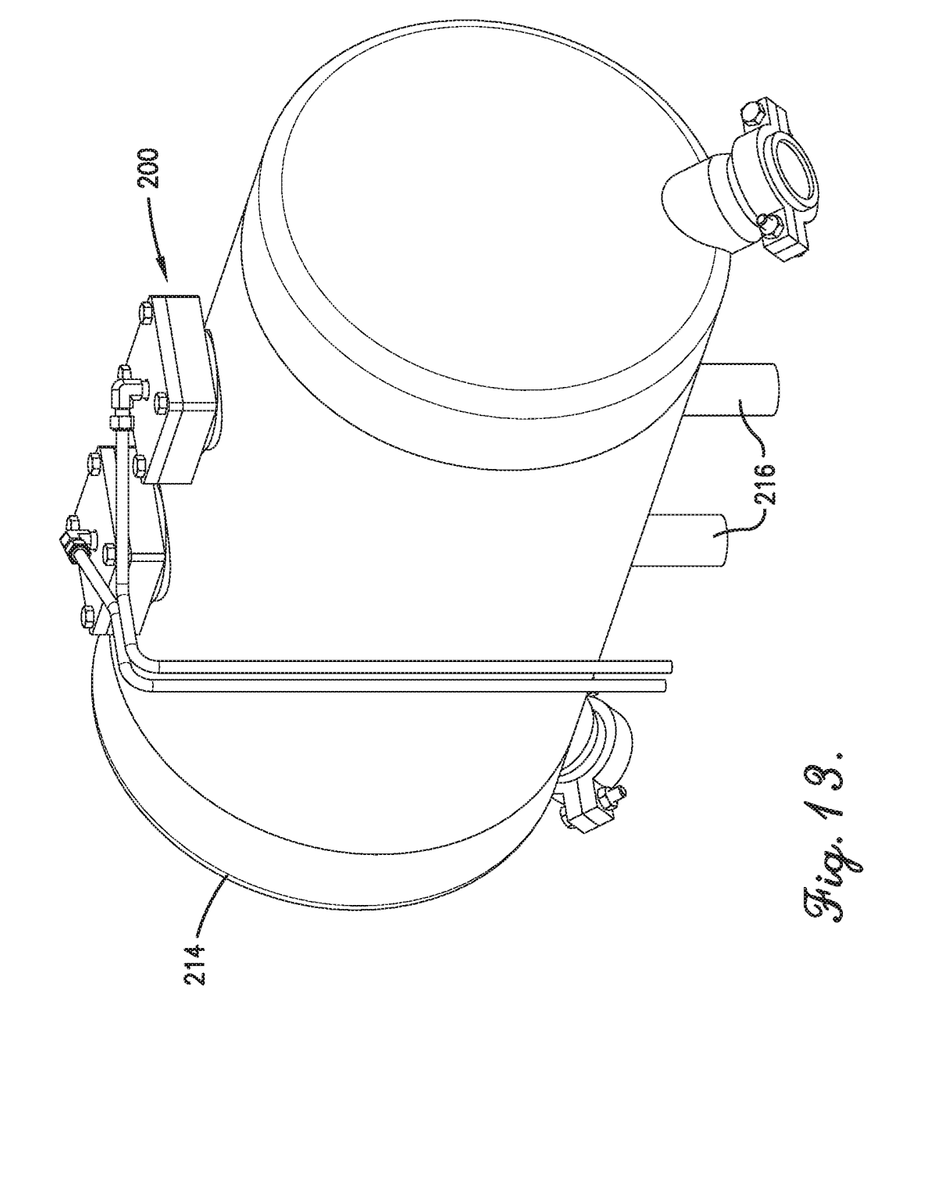
FIG. 13 depicts an embodiment of the diaphragm valve assembly positioned on the pressure vessel and purge pipe.

FIG. 13 depicts the diaphragm valve assembly 200 positioned on an air pressure tank 214 and in relation to the purge pipes 216.

Figure 15:
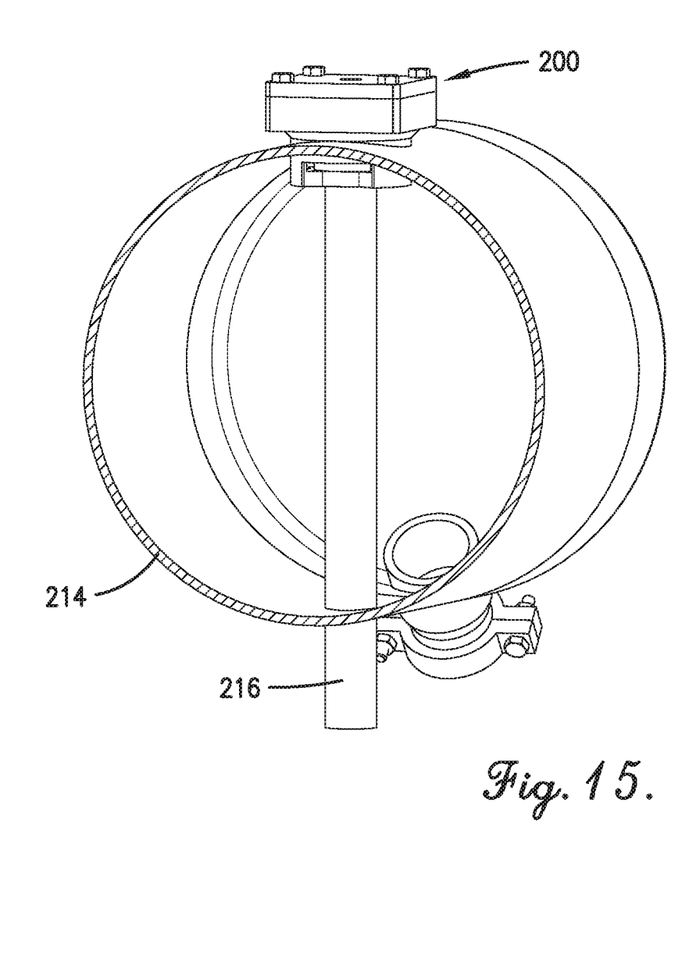
FIG. 15 depicts a cross-sectional view of the diaphragm valve assembly positioned on the pressure vessel and purge pipe.
Figure 16:
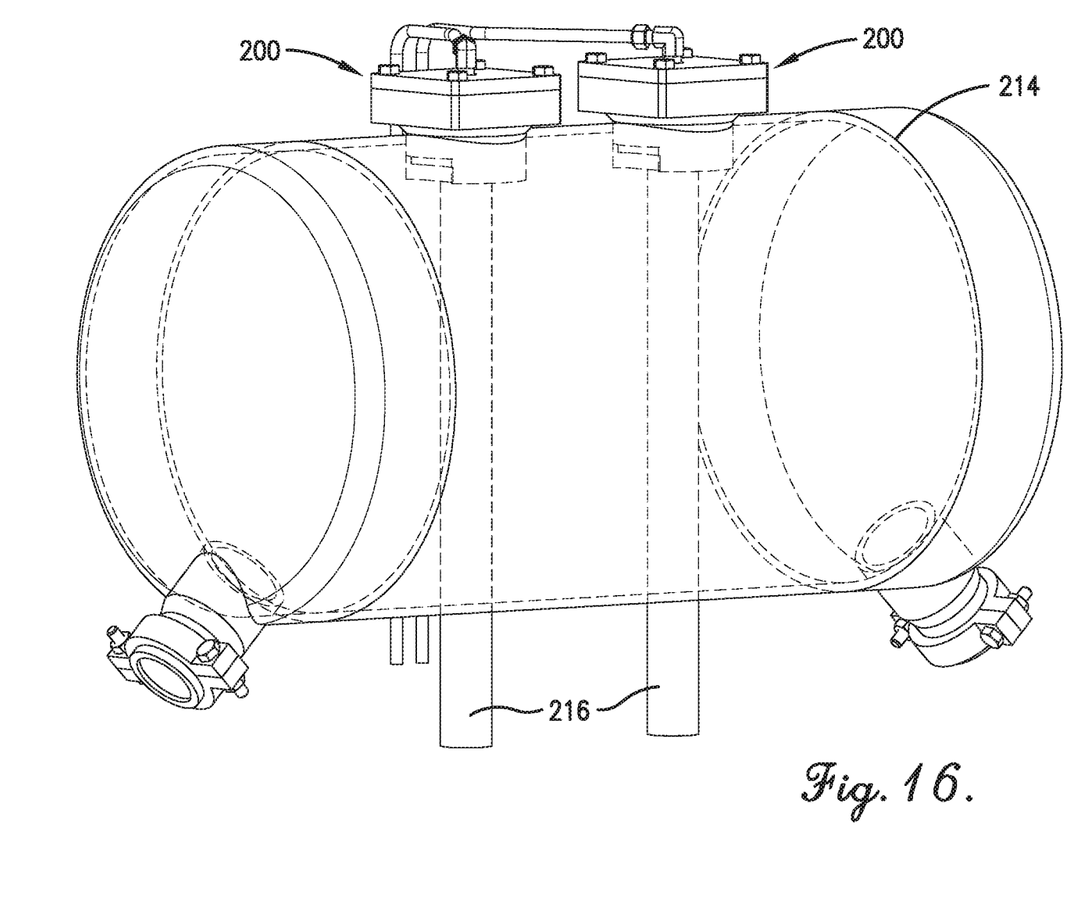
FIG. 16 depicts an alternative view of diaphragm valve assembly positioned on the pressure vessel and purge pipe.

The diaphragm valve assemblies of the present invention can be immersion style valves, wherein at least a portion of the diaphragm valve assembly 200 is placed within the pressurized air reservoir 214 of the pulse cleaning system and connected to the purge pipe 216. This immersion style configuration is depicted in FIGS. 14-16.

Figure 14:
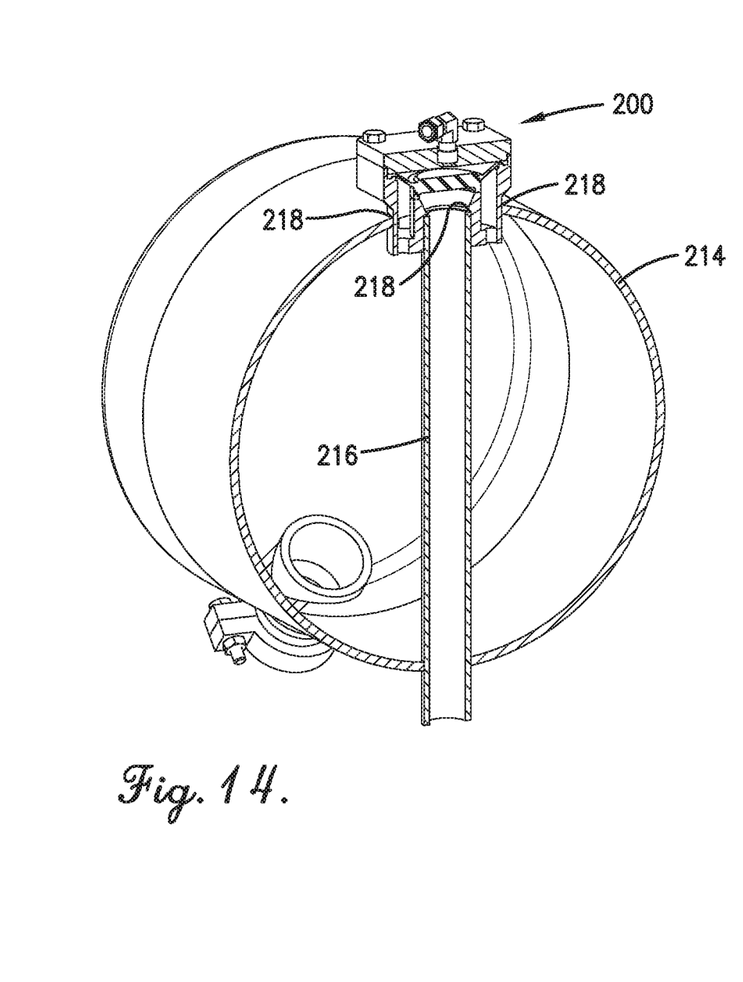
FIG. 14 depicts a cross-sectional view of the diaphragm valve assembly positioned on the pressure vessel and purge pipe.

FIG. 14 also depicts how the diaphragm valve assembly 200 may be welded 218 into place within the air reservoir tank 214 and on the purge pipe 216. As shown in FIG. 14, the diaphragm valve assembly 200 is welded 218 onto the tank 214 and purge pipe 216.

A benefit of the diaphragm valve assembly of the present invention is that they can be fitted so that they can fit any shape of connection. For example, the diaphragm valve bodies of the present invention can be used with and/or inserted into round bodies. This may be accomplished by welding the diaphragm valve body onto the desired location.

Figure 17:
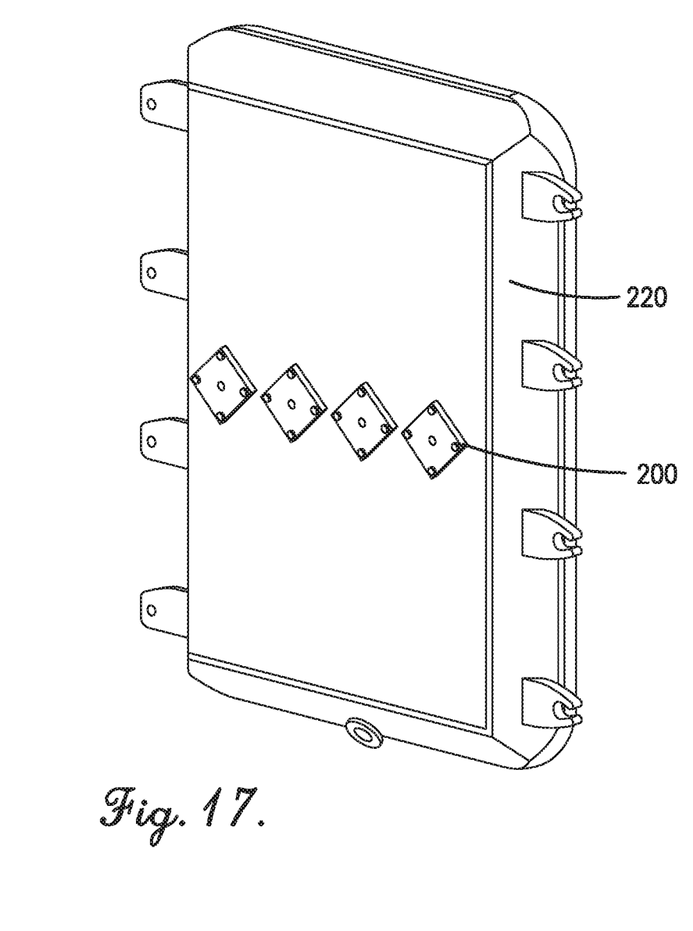
FIG. 17 depicts an alternative view of diaphragm valve assembly positioned on a flat sheet.

Lastly, in FIG. 17, an alternative embodiment is depicted wherein the diaphragm valve assembly 200 is attached to a flat sheet 220.

In various embodiments, the diaphragm body can be made from a stainless steel. Consequently, this can result in a diaphragm body that is more durable. Other benefits of the diaphragm valve assembly of the present invention is that the diaphragm body may contain less fittings, which may help enhance the sanitary conditions of the dust collection system. In other words, for example, the diaphragm valve body may contain less crevices or other nodes relative to prior art diaphragm valves, which can prevent undesirable buildup on the valve bodies of the present invention.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. An arch gasket for a dust collection system, said gasket comprising:
   (a) a main body;
   (b) a first lobe and a second lobe extending from said main body thereby forming a concave arch for contacting a plenum of said dust collection system; and
   (c) a first leg extension and a second leg extension extending from said main body thereby forming a cavity for holding at least a portion of a door of said dust collection system.

2. The arch gasket of claim 1, wherein said gasket is produced from an elastomer.

3. The arch gasket of claim 2, wherein said elastomer comprises a silicone-based elastomer.

4. The arch gasket of claim 2, wherein said elastomer exhibits a shore hardness of at least 30 durometers.

5. The arch gasket of claim 1, wherein said gasket comprises a maximum width A and a minimum width B, wherein said maximum width A is at least 1.1 times greater than said minimum width B.

6. The arch gasket of claim 1, wherein said gasket comprises a maximum length $L_1$ and said first leg extension and said second leg extension comprise a length $L_2$, wherein said maximum length $L_1$ is at least 1.1 and less than 4 times greater than said length $L_2$ of said first leg extension and said second leg extension.

7. The arch gasket of claim 1, wherein said first leg extension and said second leg extension comprise a length $L_2$ and said concave arch comprises a maximum depth $L_3$, wherein said length $L_2$ of said first leg extension and said second leg extension is at least 1.5 times greater than said maximum depth $L_3$ of said arch.

8. The arch gasket of claim 1, wherein said first leg extension, said first lobe, and said main body integrally form a second concave arch.

9. The arch gasket of claim 8, wherein said second leg extension, said second lobe, and said main body integrally form a third concave arch.

10. A dust collection system, said system comprising:
(a) a tube sheet door;
(b) a plenum; and
(c) an arch gasket at least partially disposed between said tube sheet door and said plenum, wherein said arch gasket comprises—
  (i) a main body;
  (ii) a first lobe and a second lobe extending from said main body thereby forming a concave arch, wherein said concave arch is configured to contact at least a portion of said plenum; and
  (iii) a first leg extension and a second leg extension extending from said main body thereby forming a cavity, wherein said cavity is configured to hold at least a portion of said tube sheet door.

11. The dust collection system of claim 10, wherein said gasket is produced from an elastomer.

12. The dust collection system of claim 11, wherein said elastomer comprises a silicone-based elastomer.

13. The dust collection system of claim 11, wherein said elastomer exhibits a shore hardness of at least 30 durometers.

14. The dust collection system of claim 10, wherein said gasket comprises a maximum width A and a minimum width B, wherein said maximum width A is at least 1.1 times greater than said minimum width B.

15. The dust collection system of claim 10, wherein said gasket comprises a maximum length $L_1$ and said first leg extension and said second leg extension comprise a length $L_2$, wherein said maximum length $L_1$ is at least 1.1 and less than 4 times greater than said length $L_2$ of said first leg extension and said second leg extension.

16. The dust collection system of claim 10, wherein said first leg extension and said second leg extension comprise a length $L_2$ and said concave arch comprises a maximum depth $L_3$, wherein said length $L_2$ of said first leg extension and said second leg extension is at least 1.5 times greater than said maximum depth $L_3$ of said arch.

17. The dust collection system of claim 10, wherein said first leg extension, said first lobe, and said main body integrally form a second concave arch.

18. The dust collection system of claim 17, wherein said second leg extension, said second lobe, and said main body integrally form a third concave arch.

* * * * *